United States Patent [19]
Yu

[11] Patent Number: 5,945,757
[45] Date of Patent: *Aug. 31, 1999

[54] GLASS MOTOR HOUSING HAVING REINFORCING MEMBER

[76] Inventor: Jack Yu, No. 109-1, Ave. 6, Lane 164, Tzong Sa Road, Da Du Hsiang, Taichung Hsien, Taiwan

[ * ] Notice: This patent is subject to a terminal disclaimer.

[21] Appl. No.: 09/080,796

[22] Filed: May 18, 1998

Related U.S. Application Data

[63] Continuation-in-part of application No. 08/896,127, Jul. 17, 1997, abandoned.

[51] Int. Cl.⁶ .............................. H02K 5/02; H02K 5/04; H02K 5/00

[52] U.S. Cl. .............................................................. 310/89

[58] Field of Search .................................. 510/89; 310/1, 310/89

[56] References Cited

U.S. PATENT DOCUMENTS

| | | | |
|---|---|---|---|
| 4,728,775 | 3/1988 | Van Straten | 219/202 |
| 4,760,299 | 7/1988 | Dickie et al. | 310/91 |
| 4,800,309 | 1/1989 | Lakin | 310/90 |
| 5,406,448 | 4/1995 | Anderson et al. | 361/600 |
| 5,822,179 | 10/1998 | Yu | 310/89 |

*Primary Examiner*—Clayton LaBalle
*Attorney, Agent, or Firm*—Charles E. Baxley, Esq.

[57] ABSTRACT

A motor housing is made of glass material and includes an inner middle peripheral portion having three or more curved and convex reinforcing swellings. The reinforcing swellings each includes a larger thickness than the other portions of the motor housing so as to increase the strength of the motor housing. The reinforcing swellings of the motor housing each includes one or more stepped holes for engaging with bolts and the heads of the bolts and for preventing the motor housing from being easily broken while drilling the stepped holes.

1 Claim, 2 Drawing Sheets

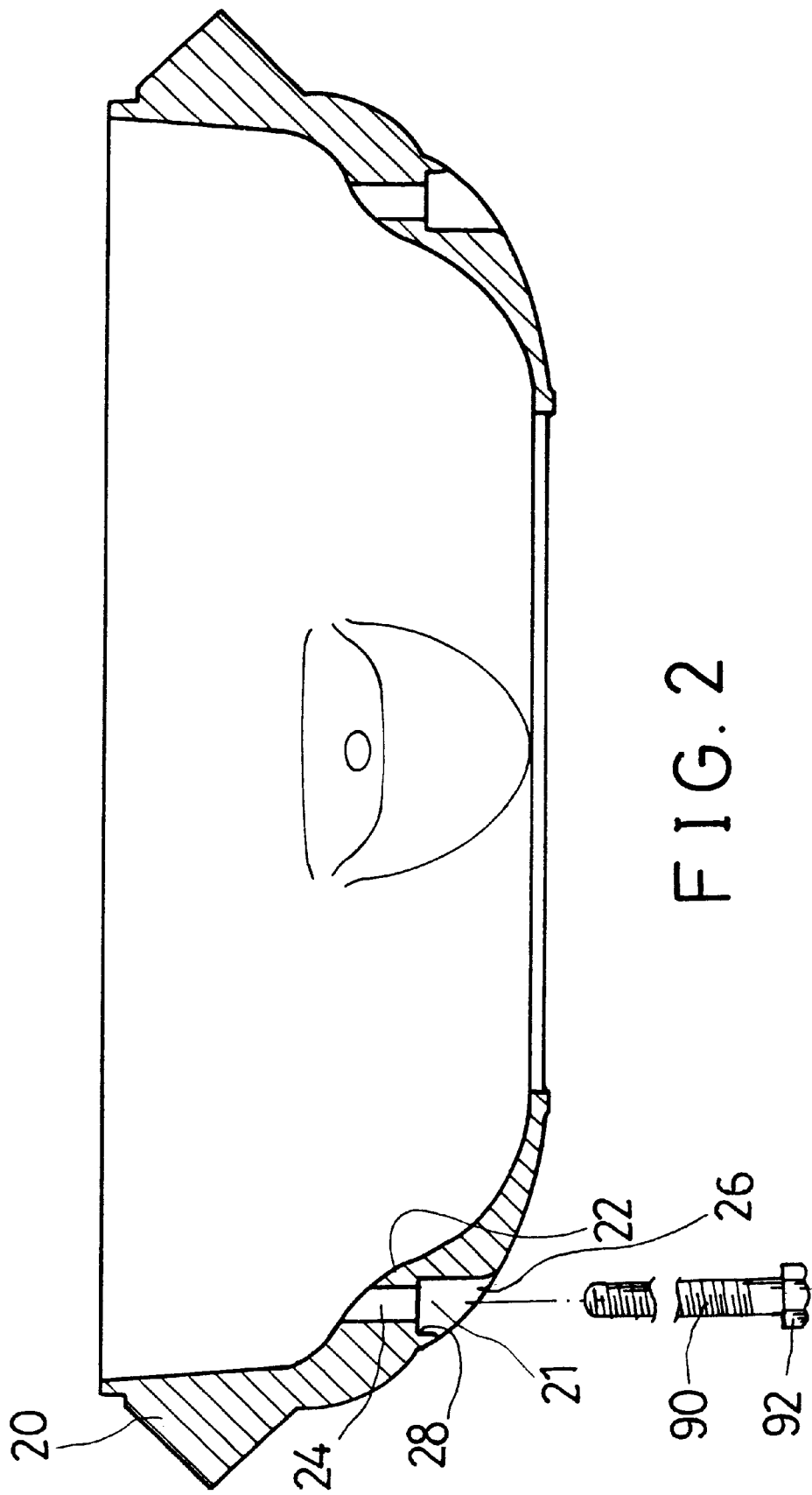

GLASS MOTOR HOUSING HAVING REINFORCING MEMBER

The present invention is a continuation-in-part of U.S. patent application Ser. No. 08/896,127, filed Jul. 17, 1997, now abandoned.

BACKGROUND OF THE INVENTION

1. Field of the Invention

The present invention relates to a motor housing, and more particularly to a motor housing of glass material having reinforcing member.

2. Description of the Prior Art

Typical motor housings are provided for covering the motors. Three typical motor housings are disclosed in U.S. Pat. No. 4,760,299 to Kickie et al., U.S. Pat. No. 4,800,309 to Lakin, and U.S. Pat. No. 5,406,448 to Anderson et al. U.S. Pat. No. 4,728,775 to Van Straten disclose an indicator light cover for vehicles and the like. All of the prior motor housings and light cover for vehicles are made of metal or similar material for strongly supporting the motor in place. The motor housings may not be made of glass materials due to the fragility of the glass material. In addition, the motor housing should be drilled with a number of holes for engaging with fasteners. The fasteners may also easily damage the glass motor housing and the glass motor housing will be easily broken when vibrations and shocks of the motor are transmitted to the fasteners.

The present invention has arisen to mitigate and/or obviate the afore-described disadvantages of the conventional motor housings.

SUMMARY OF THE INVENTION

The primary objective of the present invention is to provide a motor housing of glass material in which the motor housing includes a reinforcing member for preventing the motor housing from being easily broken.

In accordance with one aspect of the invention, there is provided a glass motor housing comprising an inner middle peripheral portion having at least three reinforcing swellings which have a larger thickness than the other portion of the motor housing for increasing the strength of the motor housing. The reinforcing swellings each includes one or more stepped holes, the stepped holes each includes a first orifice for engaging with the bolt body and each includes another orifice having a size greater than the first orifice for forming a flat annular shoulder between the orifices and for engaging with the heads of the bolts. The fastener bolts may thus be solidly engaged in the stepped holes such that the motor housing may be prevented from being easily damaged by the bolts.

Further objectives and advantages of the present invention will become apparent from a careful reading of a detailed description provided hereinbelow, with appropriate reference to accompanying drawings.

BRIEF DESCRIPTION OF THE DRAWINGS

FIG. 2 is a cross sectional view taken along lines 2—2 of FIG. 1.

DETAILED DESCRIPTION OF THE PREFERRED EMBODIMENT

Figure 1:
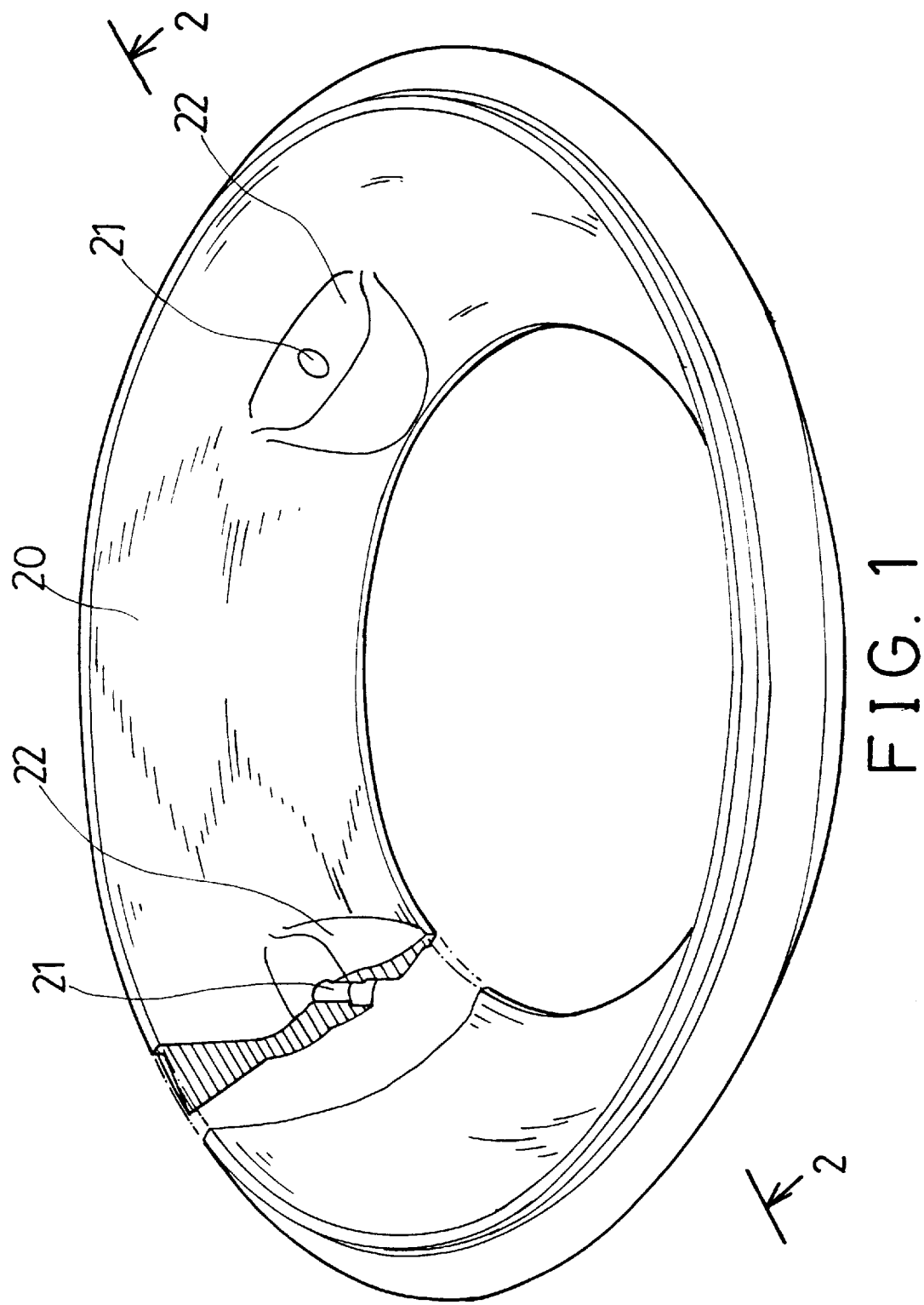
FIG. 1 is a perspective view of a motor housing in accordance with the present invention.

Referring to the drawings, a motor housing in accordance with the present invention comprises a body 20 which is made of glass materials and which includes an inner and middle peripheral portion having three or more reinforcing swellings 22 of larger thickness than the other portions of the body 20 such that the reinforcing swellings 22 may each be formed or drilled with a stepped hole 21 for engaging with bolts or screws or other similar fasteners. The stepped holes 21 may also be formed in the body 20 by such as molding processes.

The stepped holes 21 each includes a first orifice 24 of smaller size for engaging with the body of the bolt 90 and each includes a second orifice 26 having a size greater than that of the first orifice 24 for engaging with the head 92 of the bolt 90. A flat annular shoulder 28 is formed between the orifices 24, 26 for solidly engaging with the head 92 of the bolt and for preventing the body 10 from being broken by the bolts 90.

It is to be noted that the body 20 of the typical motor housing includes a uniform and small thickness such that the motor housing may be easily broken when drilling the holes in the motor housings and when engaging with the fasteners. It is very important that the motor housing includes a reinforcing swelling for increasing the strength of the motor housing such that the stepped holes can be easily drilled in the reinforcing swelling without damaging the housing body. It is also important that the glass motor housing includes one or more stepped holes formed in the reinforcing ribs for engaging with the bolts and the heads of the bolts and for preventing the glass motor housing from being easily broken.

Accordingly, the glass motor housing includes one or more reinforcing swellings that may prevent the housing from being easily broken while drilling holes in the swellings of the motor housing.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A motor housing comprising:

a motor housing body made of glass material, said glass motor housing body including an upper portion and a lower portion, and including an inner middle peripheral portion having at least three curved and convex reinforcing swellings, said reinforcing swellings each including a thickness greater than that of said upper and lower portions of said body for increase a strength of said motor housing, and said at least three reinforcing swellings each including at least one stepped hole for engaging with fastener bolt, said stepped holes each including a first orifice for engaging with the bolt and each including a second orifice having a size greater than that of said first orifice for forming a flat annular shoulder between said first orifice and said second orifice and for engaging with a head of the bolt, and for preventing said housing body from being damaged by the bolts.

* * * * *